United States Patent [19]

Rajagopalan

[11] Patent Number: 5,360,872

[45] Date of Patent: Nov. 1, 1994

[54] METHOD FOR ENHANCING THE MISCIBILITY OF HALOGENATED POLYMERS WITH IMMISCIBLE POLYMERS

[75] Inventor: Murali Rajagopalan, Avon Lake, Ohio

[73] Assignee: The Geon Company, Independence, Ohio

[21] Appl. No.: 142,881

[22] Filed: Oct. 22, 1993

Related U.S. Application Data

[63] Continuation of Ser. No. 867,596, Apr. 13, 1992, abandoned.

[51] Int. Cl.$^5$ ............... C08L 79/08; C08L 71/02
[52] U.S. Cl. ............... 525/179; 525/181; 525/187; 525/180
[58] Field of Search ............ 525/179, 181, 187, 180

[56] References Cited

U.S. PATENT DOCUMENTS

| | | | |
|---|---|---|---|
| 3,284,425 | 11/1966 | Schroeder et al. | 260/89.5 |
| 3,632,688 | 1/1972 | LeGeros | 525/187 |
| 4,217,424 | 8/1980 | Weese et al. | 525/67 |
| 4,246,374 | 1/1981 | Kopchik | 525/329 |
| 4,254,232 | 3/1981 | Mueller | 525/66 |
| 4,255,322 | 3/1981 | Kopchik | 260/45.75 K |
| 4,458,046 | 7/1984 | Hornbaker et al. | 524/399 |
| 4,650,824 | 3/1987 | Clikeman et al. | 524/457 |

FOREIGN PATENT DOCUMENTS 1133544 7/1962 Germany.

OTHER PUBLICATIONS

Journal of Vinyl Technology, Sep. 1988, vol. 10. No. 3; "Glutarimide Acrylic Copolymer: A New Route to High Heat PVC".

*Primary Examiner*—James J. Seidleck
*Assistant Examiner*—I. Zemel
*Attorney, Agent, or Firm*—Miles B. Dearth

[57] ABSTRACT

A method for improving the miscibility of vinyl halide polymer based resins with one or more essentially immiscible polymer resins is disclosed. This method comprises adding a polyimide polymer to a mixture containing the vinyl halide resin and the immiscible polymer. Articles made from these compositions are useful for medical applications.

27 Claims, No Drawings

METHOD FOR ENHANCING THE MISCIBILITY OF HALOGENATED POLYMERS WITH IMMISCIBLE POLYMERS

This is a continuation of application Ser. No. 07/867,596 filed Apr. 13, 1992 now abandoned.

BACKGROUND OF THE INVENTION

The present invention relates to a method for enhancing the miscibility of halogenated polymers with other immiscible polymers. More particularly, it relates to the use of copolymers of acrylic imides to improve the miscibility of PVC and/or CPVC polymers used in polymer-polymer blends or mixtures.

PVC is a highly versatile material which can be compounded with various types of stabilizers, impact modifiers, lubricants and plasticizers to produce numerous products ranging from rigid opaque containers to flexible transparent films. The ease with which PVC can be molded, extruded, calendered or formed and its low cost has greatly contributed to its commercial success. These copolymers are used extensively in everyday life, especially to produce articles for use in the medical device industry and in the food and drug packaging industries.

Miscibility enhancement of PVC polymers has been a very active field of research in recent years. This interest is due to the fact that it is often desirable to combine or blend PVC based polymers with one or more miscible and/or immiscible polymer based additives to improve some of the properties of the final blend. In addition, when the polymers used in the polymer-polymer blend are miscible, the improved performance characteristics obtained often result in the production of a still wider variety of potentially useful consumer products.

For purposes of this specification, the terms "miscible" or "miscibility" will be used to describe single-phase, polymer blends, or blends which have the physical characteristics of a one-phase blend. Thermodynamically speaking, every polymer has some miscibility in every other polymer, but in some cases the extent of such miscibility is exceedingly low. Therefore, many enhancement techniques have been utilized to improve miscibility. These techniques include the co-polymerization of the desired polymers to each other, either randomly or preferably in the form of A-B blocks acting as miscibility enhancers. In addition, the formation of charge transfer complexes, hydrogen bonding, cross-linking, formation of interpenetrating networks (IPN), ion-ion/ion-dipole interactions, and many other approaches have been used.

Although all of these methods have met with some success in improving the miscibility between various polymer pairs, none is particularly straight forward or consistently reliable. It is therefore highly desirable to provide an improved method for enhancing miscibility which is consistently effective and which does not require the installation of elaborate or expensive equipment for implementation.

Generally, if the resulting blend exhibits a single glass transition temperature, it is considered to be miscible. However, if the glass transition temperatures of the individual polymers comprising the blend are initially in close proximity, a single glass transition temperature may be obtained with an immiscible system. When this is the case, the fact that two polymers are immiscible may be shown by testing the properties of the final blend such as mechanical, morphology, etc.

In most cases, an immiscible polymer blend will exhibit opacity, delamination, double glass transition, or a combination of these properties. However, if the refractive indices are the same for the two polymers, even the immiscible blend will appear transparent.

These and other objects are attained by the present invention wherein at least 5 weight percent of a known acrylic imide copolymer is added to a mixture of a PVC based polymer and one or more essentially immiscible polymers to produce a final resin composition or blend possessing properties analogous to those expected for a single-phase material.

SUMMARY OF THE INVENTION

A method has now been discovered for improving the miscibility of vinyl halide polymer based resins with one or more essentially immiscible polymer resins which comprises adding a polyimide polymer to a mixture containing the vinyl halide resin and the immiscible polymer.

Polymers representative of the type which may be rendered more miscible with PVC based resins in accord with the method disclosed herein include the following: polymerizable aliphatic or aromatic polyoxiranes such as polyalkylene glycol homopolymers, e.g., polyethylene oxide polymer; polypropylene oxide polymer; polybutylene oxide polymer; styrene oxide polymer and the like; polyalkylene glycol copolymers, such as polyethylene oxide/polypropylene oxide copolymer and the like; polyacrylates both homo- and co-polymers; polymethacrylates both homo- and co-polymers; homo- and co-polymers of vinyl acetates; homo- and co-polymers of vinyl alcohols. Polyalkylene oxides are often referred to as polyoxiranes or polyalkylene glycols such as PEG and PPG, these terms, as used herein, are interchangeable. Further, the polyalkylene oxides can be end capped by reacting the usual hydroxy group with another radical to end cap the group, e.g., the hydrogen atoms could be replaced with methyl groups using well known chemical reactions. The polyalkylene glycols can have a molecular weight of from about 500 to about 2000, as determined by end group analysis. The preferred immiscible polymer(s) are polyethylene glycol (PEG) and polypropylene glycol (PPG).

The amount of polyimide required will depend upon the amount of immiscible polymer employed. Therefore if a lower amount of immiscible polymer is utilized the corresponding amount of polyimide required would be less. Accordingly, the amount of polyimide utilized is generally from about 5 parts to about 65 parts per 100 parts of polyvinyl chloride particulate resin. The preferred amount of polyimide polymer is from about 30 parts per weight to about 60 parts per weight per 100 parts vinyl halide polymer. The most preferred amount of polyimide polymer is from about 40 parts per weight to about 55 parts per weight per 100 parts vinyl halide polymer.

The polyimide polymer may be added to the polymer mixture in the presence of one or more other known processing additives commonly used in such formulations, and may be added to the mixture either before, after, or simultaneously with the introduction of such additives.

The subject invention also contemplates polymer blends for making both rigid and semi-rigid transparent, translucent or opaque articles. The polymer blends or mixtures comprise at least one vinyl halide polymer resin, one or more essentially immiscible polymer resins and a polyimide polymer. The formulations produced in accord with the method described herein are particularly suitable for use in the manufacture of medical products and/or devices including but not limited to intravenous transfusion (IVT) dispensing sets and connectors for same, dialysis tubes, blood filters, blood collection tubes, laboratory ware, trays, bedpans, clamps, packaging, containers, rigid and semi-rigid films and the like. Other articles would include rigid and semi-rigid packaging materials or films used as containers for other products. At times only a portion of the device or package will be transparent, while the remainder of the article will comprise paper, metal or a solid plastic component which may be pigmented if desired.

Vinyl polymer products intended for use in the medical device industry should desirably demonstrate sufficiently low levels of toxicity to obtain USP Certification in Classes IV through VI and should possess several critical physical characteristics. For example, when transparency is required for a desired end use, the article will require a minimum level of optical clarity and should resist discoloration after sterilization by gamma irradiation. Optical clarity is determined by measuring the percent of light transmission through an article. Luminous transmittance is defined in ASTM protocol D-1003. The percentage of light transmission through a given sample is measured in accord with ASTM D-1003 using a spectrophotometer.

The products made from the resulting composition have improved clarity (i.e., exhibit a minimum light transmission of about 70% and a haze less than about 30%). Transparent articles having approximate wall thicknesses between about 40 mils to 60 mils for use in the medical device industry should demonstrate a minimum light transmission value of at least 70% after exposure to about 2.5 Mrads of gamma irradiation and of at least 65% after exposure to about 5.0 Mrads of gamma irradiation.

The articles made in accord with this invention also exhibit a low haze value. Haze is expressed as a percentage and is measured according to ASTM D-1003. For a 60 mil sample, the articles herein described will preferably exhibit a haze less than about 25% and more preferably less than about 10% Where the terms light transmission and haze are used herein in conjunction with a percentage, it is intended that such percentage be measured according to ASTM D-1003 as previously described.

Articles subjected to sterilization require a specified degree of rigidity based on the product design and end-use application and should not undergo distortion in temperature ranges commonly used in the manufacture, sterilization, storage or transport of such articles. The formulations used in making these articles should demonstrate good processability characteristics as needed for a specified method of manufacture (e.g. injection molding or extrusion). Such characteristics include good thermal stability and preferred minimum and maximum rates of melt flow and melt viscosity.

As stated above, one particular area of concern for medical device application is the capability of a PVC formulation to resist discoloration after sterilization by gamma irradiation. Several additives have been proposed for this purpose including the addition of plasticizers, antioxidants, acid scavengers, and gamma PVC stabilizers, to mention a few. Limited success has been achieved by employing one or more of these additives in combination.

Recently it was discovered that the addition of about 10 phr of a poly(alkylene glycol) such as polypropylene glycol (PPG) having a molecular weight of from about 500 to about 2000, as determined by end group analysis, to a PVC compound improves the gamma resistivity of PVC. However, the addition of the PPG polymer to the PVC compound resulted in an end product that was opaque, indicating a lack of miscibility between PVC and PPG. In contrast, when the PPG was omitted from the formulation, transparent products were produced.

Polyvinyl chloride, PVC, vinyl polymer, or vinyl polymer material, as used herein, refers to homopolymers and copolymers of vinyl halides and vinylidene halides and includes post halogenated vinyl halides such as CPVC. Examples of these vinyl halides and vinylidene halides are vinyl chloride, vinyl bromide, vinylidene chloride and the like. The vinyl halides and vinylidene halides may be copolymerized with each other or each with one or more polymerizable olefinic monomers having at least one $CR_2=C<$ grouping where R is H or lower alkyl or halogenated lower alkyl. As examples of such olefinic monomers, there may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, hydroxyethyl acrylate, and the like; esters of methacrylic acid, such as methyl methacrylate, butyl methacrylate, hydroxyethyl methacrylate, and the like; nitriles, such as acrylonitrile, methacrylonitrile, and the like; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives, such as $\alpha$-methyl styrene, vinyl toluene, chlorostyrene, vinyl naphthalene, and the like; vinyl esters like vinyl acetate, vinyl stearate and the like; allyl and vinyl chloroacetate, vinyl acetate, vinyl pyridine, methyl vinyl ketone; and diolefins, including butadiene, isoprene, chloroprene, and the like; and other polymerizable olefinic monomers of the types known to those skilled in the art.

The present invention is particularly applicable to homopolymers and copolymers made by the polymerization of vinyl chloride or vinylidene chloride alone or in admixture with one or more polymerizable olefinic monomers copolymerizable therewith in amounts up to about 20 percent by weight, based on the weight of the monomer mixtures. Some copolymers have a tendency to decrease the clarity of the article and therefor the comonomer amount in the copolymer should be minimized if clear articles are desired.

The most preferred vinyl polymer, or resin, is polyvinyl chloride (PVC) homopolymer produced by the mass or suspension polymerization process and the invention, for simplicity and convenience, will be described in connection therewith, it being understood that this merely intended in an illustrative sense and not limitative. Articles of this invention may be made from suspension resins, mass resins or combinations of both.

The polymers used in the production of the articles described herein will generally exhibit an inherent viscosity in a cyclohexanone solvent system at 30° C. in a range of from about 0.5 to about 0.7 when used for injection molding and from about 0.8 to about 1.2 when intended for use with extrusion processes. However, as is well known by those skilled in the art, polymers exhibiting higher inherent viscosities may be rendered suitable for use in injection molding or extrusion processes by the addition of appropriate known additives or compounding techniques.

Inherent viscosity (i.v.) is directly proportional to molecular weight, and is defined an ASTM D-1243 as the ratio of the natural logarithm relative viscosity to the concentration. Relative viscosity is the ratio of the flow time of a specified solution of the polymer to the flow time of the pure solvent. The International Union of Pure and Applied Chemistry (IUPAC) term for i.v. is "logarithmic viscosity number." Where the designation "i.v." or "logarithmic viscosity number" is used herein in conjunction with a specified number, it is intended that such number be measured in accord with ASTM D1243 as described above.

It is known that PVC resins are miscible in all proportions with certain polyaliphatic imide copolymers. Presently, such copolymers are generally incorporated into PVC formulations as heat distortion modifiers for purposes of increasing the dimensional stability of the finished PVC article beyond its normal heat distortion range. For most rigid polymer applications, the finished product should not distort or deform at temperatures below 60° C. (140° F). For certain specialized applications such as the medical device field, several other processability characteristics are desired by the manufacturer which may make it necessary to add more liquid to the base formulation in the form of, for example, a liquid plasticizer. The increased amount of liquid will generally result in a lower heat distortion temperature which means that the end product may not withstand the normal temperatures of sterilization or transportation and storage. Accordingly, the addition of a heat distortion modifier permits the addition of other beneficial ingredients or higher amounts of such ingredients without a corresponding loss of rigidity upon exposure to heat. For purposes of improving the dimensional stability of PVC articles, heat distortion modifiers are commonly added at a concentration range from about 2–50 phr.

The polyimides preferred in practice in the present invention are imide-methacrylate copolymers and/or polyaliphatic imide copolymers. These materials usually have high Tg values and will increase the heat distortion of a base polymer when incorporated in a blend. The preparation of these polyimides is described by Kopchik, U.S. Pat. No. 4,246,374, hereby incorporated by reference into the present specification. The polyimide copolymers may have polar groups present or the polar groups can be substantially removed. A process for removal of these polar groups is described in U.S. Pat. No. 4,727,117 to Hallden-Abberton, hereby incorporated by reference into the present specification. Several of these are manufactured and sold by the Rohm and Haas Company under the trade names of Paraloid ® HT-510, Paraloid ® EXL-4151, Paraloid ® EXL4171, Paraloid ® EXL-4241 and Paraloid ® EXL-4261. Also useful are imide copolymers, e.g., a maleimide/styrene copolymer and the like.

When polyimides are employed in an amount from about 5 parts by weight to about 50 parts by weight per 100 parts by weight of PVC resin is added to a polymer formulation containing PVC and one or more immiscible polymers, the final polymer blend obtained may exhibit a single glass transition temperature and/or improved optical properties i.e., a reduction in the opacity of the composition.

It has further been discovered that when the polyimides are added to an immiscible blend of PVC and a polyalkylene glycol in an amount between 30 parts per weight to about 50 parts per weight, the finished PVC based article produced will be transparent and exhibit a minimum light transmission of about 70 and a haze less than about 12%. To obtain some miscibility without producing a transparent end product, it is generally preferred that at least 5 weight percent of polyimides like Paraloid HT-510 be added to the polymer-polymer blend. In this case, the resulting miscibility of the polymers contained in the blend will not be visibly shown by transparency but will be demonstrated by the improvement in the physical properties, e.g. heat distortion, exhibited by the resultant mixture.

The polymer based end products produced in accord with this invention will preferably contain, in addition to the polymers and copolymers described above, an essential stabilizer system. Generally, the formulations having utility for making the articles disclosed herein will include a combination of stabilizers comprising at least one known thermal stabilizer and may also include any of the gamma irradiation stabilizers.

The vinyl polymer compositions of this invention will contain about 1 to about 5 parts by weight of one or more thermal stabilizers. Typically, the dialkyltin stabilizers will have alkyl groups on the stabilizer having from about 1 to about 15 carbon atoms, and preferably has about 8 carbon atoms.

Dialkyltin thermal stabilizers generally have the formula:

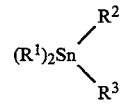

wherein $R^1$ in the above formula is a C1–C8 group, $R^2$ and $R^2$ are usually the same organic group but different from $R^1$. Such groups may contain oxygen or sulfur. Examples of suitable dialkyltin thermal stabilizers are well known in the art. One such stabilizer is a dioctyltin composition marketed by M & T Chemicals under the trademark "PA 1753." Another known dialkyltin type thermal stabilizer is a methyltin compound and is sold by Witco Corporation under the trademark "MARK 1984."

Generally, antioxidants are employed in PVC compounds at a concentration range of from about 0.25 parts to about 5 parts per 100 parts of resin. Examples of these antioxidants are hydroxy phenyl compounds such as butylated hydroxy toluene (BHT), butylated hydroxy anisole (BHA) and the like. In a preferred embodiment, the formulations of the invention may contain from about 0.5 parts to about 3 parts of antioxidant per 100 parts of resin. More preferably about 1 part of BHT as an antioxidant per 100 parts of resin will be employed. Other suitable known antioxidants may be used herein including hydroquinone and derivatives of hydroquinone, alkyl and dialkyl phenol derivatives, and phosphites. The levels employed would be similar to those described above.

Other optional stabilizers may be added primarily to enhance heat stability. For instance, compositions have been successfully prepared employing an epoxy co-stabilizer, as it is commonly called in the polyvinyl chloride industry, to impart heat stability. Epoxidized soybean oil is frequently used for this purpose. Normally, the epoxidized soybean oils are added in the range of about 2 to about 10 phr, a conventional level of the usage for heat stability in rigid PVC applications without adversely effecting rigidity. Other stabilizers can also be used, if desired, with the epoxidized soybean oils; for instance, calcium/zinc, soap stabilizers. Such calcium/zinc stabilizers are well known in the art and are fully disclosed in U.S. Pat. No. 4,751,118, incorporated by reference herein.

In addition to these ingredients, the vinyl halide polymer compositions of this invention may also contain minor amounts of other polymer formulation additives known to those skilled in the art. These ingredients include plasticizers, heat distortion modifiers, lubricants, impact modifiers, processing aids, co-stabilizers, antioxidants, UV screeners such as benzophenones and substituted acrylates, waxes, odorants, pigments or colorants and flavoring agents.

The compositions of this invention are used to produce rigid or semi-rigid articles of manufacture and therefore do not normally contain high amounts of plasticizer. Commercially available plasticizers may be added to the composition of the present invention as the incorporation of liquid plasticizers may be desirable to enhance the flow properties and thermal stability of the resultant formulation. Suitable commercially available plasticizers which may be added to the composition of the present invention are adipate or glutarate plasticizers or a mixture of these plasticizers. Accordingly, the amount of plasticizer which may be used in the formulations disclosed herein will be less than that normally recommended as a plasticizing amount (e.g., less than the amount recommended to obtain product flexibility). Generally, the amount added will be that which achieves product clarity without causing product flexibility which is in the range of 0 parts to about 25 parts by weight for 100 parts by weight of vinyl halide polymer. For Rigid applications the preferred maximum plasticizer loading of about 2 parts to about 15 parts per 100 parts of resin should produce acceptable heat distortion characteristics. These plasticizers are preferably an ether-containing adipate or glutarate having a molecular weight less than about 2,000, and preferably less than about 500. Examples of suitable adipates include dioctyl adipate (DOA), as well as other dialkyl adipate or glutarate derivatives.

Various conventional additives can be utilized in the compositions of the present invention. Thus, heat stabilizers, lubricants, impact modifiers, fire retardants, antioxidants, UV inhibitors, and processing aids generally employed for use in polymers, specifically in PVC can be implemented. Various fillers and pigments can also be employed in conventional amounts.

Examples of suitable lubricants are polyglycerols of di- and trioleates; calcium soaps; zinc soaps; stearic acid, epoxidized oils and the like. These compounds are commercially available from a number of sources. Examples of suitable calcium soaps are calcium stearate, calcium laurate, calcium oleate, calcium palmitate, calcium octanoate, and calcium benzoate. Examples of suitable zinc soaps are zinc stearate, zinc laurate, zinc palmitate, zinc 2-ethyl hexanoate, zinc octanoate, zinc oleate, and zinc benzoate. The preferred calcium soap is Calcium stearate. The preferred zinc soap is Zinc stearate. Co-stabilizers that are well known in the art include organic, non-metallic stabilizers or co-stabilizers include epoxidized soybean oil tri(nonylphenyl) phosphite, $\beta$-diketones, and phenylindole. Typical impact modifiers include ABS, MBS and the like. The amounts and types of additives, fillers, impact modifiers, lubricants and/or pigments required are well known to those skilled in the art.

The Tg of a polymer is a measure of the glass transition temperature of the polymer. The glass transition is the temperature at which a polymer changes from a glassy to a rubbery state. The addition of a polymer which has a high Tg will usually increase the heat distortion properties of the base polymer.

The heat distortion temperature as defined herein is the temperature wherein a plastic specimen deforms a specified distance under a specified load. The heat distortion testing was conducted in accordance with ASTM D-648 using a load of 264 psi.

The concentration of polyimide in the polymer-polymer blend can be from about 5 weight percent to about 50 weight percent depending upon whether transparency is desired in the finished end product. Concentrations above 50% may also be used.

It is preferable to add the polyimide to the PVC/immiscible polymer blend prior to introducing the other additives. However, in certain instances it may be desirable to add the polyimide simultaneously with the other formulation additives or after the formulation additives have been introduced. Without departing from teachings of this invention, the miscibility of the polymer/polymer blends may be enhanced regardless of the order of mixing.

The compositions of this invention may be injection molded into numerous rigid and semi-rigid shapes. Extrusion, blow molding, calendering, vacuum forming and other known methods may also be employed depending upon the desired end product. The wall thickness of parts made from the compositions of the present invention can vary from about 20 mils to 250 mils and are preferably about 40 to 60 mils thick or thicker. The process of forming the compositions into useful finished articles is well known and understood by those skilled in the art.

The invention will now be illustrated by examples. The examples are not intended to be limiting of the scope of the present invention. In conjunction with the general and detailed description above, the examples provide further understanding of the present invention and demonstrates some preferred embodiments of the invention.

EXAMPLE A

Several formulations were prepared which incorporated PVC and poly(propylene glycol) (PPG). The ingredients were processed following standard procedures for PVC processing using a 2-roll mill. Examples 1 and 2 are outside the scope of the present invention and serve as controls. The formulations and results are listed in Table 1. All amounts are parts per 100 parts of PVC resin. The haze was measured on 60 mil plaques.

TABLE 1

| Ingredients | EXAMPLE NO. | | | | | |
|---|---|---|---|---|---|---|
| | 1 | 2 | 3 | 4 | 5 | 6 |
| PVC | 100 | 100 | 100 | 100 | 100 | 100 |
| PPG | — | 10 | 10 | 10 | 10 | 10 |
| Polyimide[1] | — | — | 6.2 | 12.3 | 24.7 | 49.3 |
| Additives[2] | 18.5 | 18.5 | 18.5 | 18.5 | 18.5 | 18.5 |

TABLE 1-continued

| Ingredients | EXAMPLE NO. | | | | | |
|---|---|---|---|---|---|---|
| | 1 | 2 | 3 | 4 | 5 | 6 |
| Appearance | Transparent | Opaque | Opaque | Moderately Opaque | Slightly Opaque | Transparent |
| % Haze[3] | 12.2 | 97.6 | >90 | >60 | >30 | 7.8 |
| Tg | 80.4 | 67.4 | — | — | — | 83.6 |

[1]Paraloid ® HT-510 from Rohm & Haas Co. (imide-methacrylate copolymer)
[2]Tin stabilizers, process aid, impact modifier, antioxidant and lubricant.
[3]ASTM D-1003 as described in the specfication was employed.

The data in Table 1 illustrates the improvement in optical and physical properties. The addition of 10 parts of polyalkylene glycol caused a reduction in the transparency and lowered the Tg. The addition of the polyimide compatibilized the PVC/PPG so as to restore and improve the properties.

EXAMPLE B

Several formulations were prepared which have PVC and poly(ethylene glycol) (PEG). The test conditions were similar to Example A. The results are in Table 2.

TABLE 2

| Ingredient | EXPERIMENT NO. | | |
|---|---|---|---|
| | 1 | 2 | 3 |
| PVC | 100 | 100 | 100 |
| PEG | — | 10 | 10 |
| Polyimide[1] | 0 | 0 | 49 |
| Additives[2] | 18.5 | 18.5 | 18.5 |
| Appearance | Transparent | Opaque | Transparent |
| % Haze[3] | <10 | 97.6 | <10 |

[1]Paraloid ® HT-510 from Rohm & Haas Co. (imide-methacrylate copolymer)
[2]Tin stabilizers, process aid, impact modifier, antioxidant and lubricant.
[3]ASTM D-1003 as described in the specification was employed.

The data in Table 2 further illustrates the improvement achieved when a polyimide is added to the blend.

The above preferred embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A polymer blend comprising 100 weight parts vinyl halide polymer resin, polyalkylene glycol and from about 12 to 65 parts by weight of polyimide polymer, wherein said blend exhibits a minimum light transmission of about 70% measured according to ASTM D-1003.

2. The polymer blend according to claim 1 wherein the amount of polyimide is from about 40 parts to about 55 parts.

3. The polymer blend according to claim 1 wherein the polyalkylene glycol is polyethylene glycol (PEG).

4. The polymer blend according to claim 1 wherein the polyalkylene glycol is polypropylene glycol (PPG).

5. The polymer blend according to claim 1 wherein the vinyl halide polymer is a copolymer of vinyl chloride and one or more copolymerizable monomers.

6. The polymer blend according to claim 5 wherein the copolymerizable monomer is an acrylic or methacrylic ester.

7. The polymer blend according to claim 6 wherein the copolymerizable monomer is hydroxyethyl acrylate or hydroxyethyl methacrylate.

8. The polymer blend according to claim 6 wherein the copolymerizable monomer is 2-ethylhexyl acrylate.

9. The polymer blend according to claim 5 wherein the copolymerizable monomer is vinylidene chloride.

10. The polymer blend according to claim 1 wherein the blend is characterized by a high degree of clarity as defined by having:

a percent haze value less than 25% for a 60 mil film.

11. The polymer blend according to claim 10 wherein the blend is characterized by a high degree of clarity as defined by having:

a percent haze value less than 10% for a 60 mil film.

12. The polymer blend according to claim 1 wherein said polyalkylene glycol is selected from the group consisting of polyethylene oxide, polyporpylene oxide, polybutylene oxide, and styrene oxide polymer.

13. A method for improving the miscibility of a blend of vinyl halide polymer and polyalkylene glycol immiscible polymer, comprising: incorporating from about 12 weight parts to 65 weight parts of polyimide polymer per 100 weight parts of said polyvinyl halide, and wherein after incorporation said polyimide, said blend exhibits a minimum light transmission of about 70% measure according to ASTM D-1003.

14. The method according to claim 13 wherein the amount of polyimide is from about 40 parts to about 55 parts.

15. The method according to claim 13 wherein said polyalkylene glycol is polyethylene glycol (PEG).

16. The method according to claim 13 wherein said polyalkylene glycol is polypropylene glycol (PPG).

17. The method according to claim 13 wherein the vinyl halide polymer is polyvinyl chloride homopolymer.

18. The method claim 13 wherein the vinyl halide polymer is a copolymer of vinyl chloride and one or more copolymerizable monomers.

19. The method according to claim 18 wherein the copolymerizable monomer is an acrylic or methacrylic ester.

20. The method according to claim 19 wherein said acrylic or methacrylic ester is hydroxyethyl acrylate or hydroxyethyl methacrylate.

21. The method according to claim 19 wherein said acrylic ester monomer is 2-ethylhexyl acrylate.

22. The method according to claim 18 wherein the copolymerizable monomer is vinylidene chloride.

23. The method of claim 13 wherein said polyimide is polyaliphatic imide.

24. The method of claim 13 wherein said polyimide is an imide-methacrylate compolymer.

25. The method of claim 13 further comprising the steps of incorporating a thermal stabilizer and an antioxidant into said blend.

26. The method of claim 24 further comprising the steps of incorporating at least one conventional additive selected from the group consisting of plasticizer, lubricant, impact modifier, fire retardant, UV screener, filler, pigment, colorant, and processing aid.

27. The method of claim 13 wherein said polyalkylene glycol is selected from the group consisting of polyethylene oxide, polypropylene oxide, polybutylene oxide, and styrene oxide polymer.

* * * * *